(12) United States Patent
Hars et al.

(10) Patent No.: US 10,313,128 B2
(45) Date of Patent: Jun. 4, 2019

(54) ADDRESS-DEPENDENT KEY GENERATOR BY XOR TREE

(71) Applicant: The Boeing Company, Chicago, IL (US)

(72) Inventors: Laszlo Hars, Lafayette, CO (US); Donald P. Matthews, Longmont, CO (US)

(73) Assignee: THE BOEING COMPANY, Chicago, IL (US)

( * ) Notice: Subject to any disclaimer, the term of this patent is extended or adjusted under 35 U.S.C. 154(b) by 561 days.

(21) Appl. No.: 14/473,006

(22) Filed: Aug. 29, 2014

(65) Prior Publication Data
US 2016/0065368 A1 Mar. 3, 2016

(51) Int. Cl.
| | | |
|---|---|---|
| *G06F 11/30* | (2006.01) | |
| *G06F 12/14* | (2006.01) | |
| *H04L 9/32* | (2006.01) | |
| *G06F 21/78* | (2013.01) | |
| *H04L 9/00* | (2006.01) | |
| *H04L 9/08* | (2006.01) | |

(52) U.S. Cl.
CPC ........ *H04L 9/3242* (2013.01); *G06F 12/1408* (2013.01); *G06F 21/78* (2013.01); *H04L 9/002* (2013.01); *H04L 9/0861* (2013.01)

(58) Field of Classification Search
CPC ........................... H04L 9/0631; G06F 12/1408
See application file for complete search history.

(56) References Cited

U.S. PATENT DOCUMENTS

| | | | |
|---|---|---|---|
| 5,963,104 A | * | 10/1999 | Buer ................. G06F 7/588 331/78 |
| 7,093,137 B1 | | 8/2006 | Sato et al. |
| 7,469,344 B2 | | 12/2008 | Folmsbee |
| 7,802,108 B1 | | 9/2010 | Master et al. |
| 7,894,599 B2 | | 2/2011 | Rigler |
| 7,937,595 B1 | | 5/2011 | Kumar et al. |
| 8,370,645 B2 | | 2/2013 | Asnaashari |

(Continued)

OTHER PUBLICATIONS

Al-Hazaimeh, "Design of a New Block Cipher Algorithm," IISTE, Network and Complex Systems, vol. 3, No. 8, 2013, 7 pages.

(Continued)

*Primary Examiner* — Mahfuzur Rahman
*Assistant Examiner* — Darshan I Dhruv
(74) *Attorney, Agent, or Firm* — Womble Bond Dickinson (US) LLP (57) ABSTRACT

A method of providing security in a computer system includes producing a plurality of sub-keys from key material and a respective address of a memory location in a memory and possibly other information. The method may include mixing the sub-keys together using a binary tree of exclusive-or operations, and to produce an intermediate result. The method may include performing a scrambling operation on the intermediate result to produce a key with which a block of ciphertext may be produced. And the method may include performing a write operation to write the block of ciphertext at the memory location having the respective address. In this regard, the memory may include a window of memory locations each of which stores a respective block of ciphertext produced with a respective key that changes from memory location to memory location.

16 Claims, 4 Drawing Sheets

(56) References Cited

U.S. PATENT DOCUMENTS

| | | | |
|---|---|---|---|
| 8,504,849 B2 | 8/2013 | Jogand-Coulomb et al. | |
| 2003/0198345 A1 | 10/2003 | Van Buer | |
| 2004/0042671 A1* | 3/2004 | Westphal | G06T 9/00 382/232 |
| 2006/0265563 A1* | 11/2006 | Goettfert | G06F 12/1408 711/164 |
| 2008/0270505 A1* | 10/2008 | Bolotov | G06F 7/724 708/492 |
| 2009/0052659 A1* | 2/2009 | Gueron | H04L 9/0631 380/29 |
| 2010/0115286 A1* | 5/2010 | Hawkes | G06F 12/1408 713/189 |
| 2010/0299538 A1* | 11/2010 | Miller | G06F 12/1408 713/190 |
| 2013/0013934 A1* | 1/2013 | King | G06F 21/79 713/190 |
| 2013/0117577 A1* | 5/2013 | Hars | G06F 12/1408 713/190 |
| 2013/0336480 A1* | 12/2013 | Hong | H04L 9/0618 380/44 |
| 2014/0208109 A1* | 7/2014 | Narendra Trivedi | H04L 9/0643 713/170 |

OTHER PUBLICATIONS

Beaulieu et al., "The Simon and Speck Families of Lightweight Block Ciphers," NSA, Jun. 2013, 45 pages.

Bogdanov et al., "Present: An Ultra-Lightweight Block Cipher," Cryptographic Hardware and Embedded Systems—CHES 2007, Lecture Notes in Computer Science, vol. 4727, 2007, pp. 450-466.

Hars et al., "Pseudorandom recursions II," EURASIP Journal on Embedded Systems, 2012, 11 pages.

Knudsen et al., "PRINTcipher: A Block Cipher for IC-Printing," Cryptographic Hardware and Embedded Systems, CHES 2010, Lecture Notes in Computer Science, vol. 6225, Aug. 2010, 15 pages.

"Feistel cipher," 2014, Wikipedia article—http://en.wikipedia.org/w/index.php?title=Feistel_cipher&oldid=591294982 [May 27, 2014], 6 pages.

"Linear feedback shift register," 2014, Wikipedia article—http://en.wikipedia.org/w/index.php?title=Linear_feedback_shift_register&oldid=609519852 [May 27, 2014], 10 pages.

"Power analysis," 2014, Wikipedia article—http://en.wikipedia.org/w/index.php?title=Power_analysis&oldid=609430707 [May 27, 2014] 4 pages.

Examination Report dated Feb. 25, 2016 for Application No. GB1515044.4.

Giorgio Natele et al., "Self-Test Techniques for Crypto-Devices", vol. 18, No. 2, Feb. 2010.

* cited by examiner

ADDRESS-DEPENDENT KEY GENERATOR BY XOR TREE

CROSS-REFERENCE TO RELATED APPLICATION(S)

The present application is related to U.S. patent application Ser. No. 13/722,871, entitled: Secure Memory Transaction Unit, filed on Dec. 20, 2012, now U.S. Pat. No. 8,843,767 issued Sep. 23, 2014, which is a continuation-in-part of and claims priority to U.S. patent application Ser. No. 13/341,630, entitled: Infinite Key Memory Transaction Unit, filed on Dec. 30, 2011, now U.S. Pat. No. 8,839,001 issued Sep. 16, 2014, which in turn claims priority to U.S. Provisional Patent Application No. 61/505,039, entitled: Secure Server for Configuring and Programming Secure Microprocessors and Infinite Key Memory Transaction Unit, filed on Jul. 6, 2011. The contents of all of the aforementioned are incorporated herein by reference in their entireties.

TECHNOLOGICAL FIELD

The present disclosure relates generally to the protection of data in a computer system and, in particular, to the protection of data stored in memory in a computer system, which data is often transferred on one or more buses therein.

BACKGROUND

To provide for secure communications and protection of financial, military, medical or other data requiring a high degree of protection, computer and microprocessor-based systems now implement various security measures. These measures are generally intended to preclude an adversary's illicit access to data stored in a memory being accessed by the microprocessor, for example, because the memory and microprocessor are on the same circuit board and/or coupled by a bus.

Common types of attacks on such processors can be categorized as active or passive attacks. In passive attacks an adversary reads the contents of the memory, in the hope to discover secrets, like passwords, copyrighted material, etc. A passive attacker can also monitor the data traffic between the processor and the memory (or some peripherals) for secrets.

Active attacks attempt to modify the contents of the memory, or the data traffic between the memory and the processor. Active attacks include attempts to copy-and-paste memory blocks between different locations, or playing back earlier content of the same, or another location. Such attacks can cause harm, for example by creating an infinite loop, or otherwise impact the program. In a known data recognition attack, an adversary may attempt to learn an encryption key by watching writes of known data to the same address.

It may therefore be desirable to have a system and method that addresses these challenges, and improves upon existing practices.

BRIEF SUMMARY

A technique has been developed to address malicious attempts to copy-and-paste memory blocks between different locations. This technique involves memory address-dependent encryption and address-dependent data authentication, which can be implemented by a "tweakable" cipher, where part of the key (the tweak value) may depend on the memory location and perhaps other information (e.g., version value, configuration data). This may provide a desired diversification of the data encryption and authentication. Because this and perhaps other techniques may rely on a number of different, unrelated keys, it may be desirable to have a key generation algorithm that is fast.

In view of the foregoing, example implementations of the present disclosure include a system and method for providing security in a computer system. Example implementations provide an algorithm that may be applied to generate a key for encryption of plaintext. In a number of practical secure computing systems implementing the algorithm, only one or two clock cycles may be necessary to compute a key. In these computing systems, for example, used secret random key material may be stored in flip-flops, which may avoid the need for slow internal memory read operations to access it.

According to one aspect of example implementations, a method of providing security in a computer system includes producing a plurality of sub-keys from key material and a respective address of a memory location in a memory. The method may include mixing the sub-keys together using a binary tree of exclusive-or operations, and to produce an intermediate result. The method may include performing a scrambling operation on the intermediate result to produce a key with which a block of ciphertext may be produced. In some examples, the scrambling operation may be a cipher of the intermediate result with another key. And the method may include performing a write operation to write the block of ciphertext at the memory location having the respective address. In this regard, the memory may include a window of memory locations each of which stores a respective block of ciphertext produced with a respective key that changes from memory location to memory location.

In some examples, the respective address may be represented as a sequence of bits at respective positions, and the key material may be represented as a sequence of blocks at respective positions. In these examples, producing the plurality of sub-keys may include identifying a plurality of bits from the sequence of bits, and selecting a plurality of blocks from the sequence of blocks at respective positions corresponding to those of the plurality of bits, with the plurality of blocks being selected as the plurality of sub-keys.

In some further examples, identifying the plurality of bits may include identifying only those bits of the sequence of bits having a preset binary value (e.g., binary value of one).

In some further examples, the sequence of blocks may include a first sequence of blocks and a second sequence of blocks. In these examples, identifying the plurality of bits may include identifying as a first one or more bits those bits of the sequence of bits having a binary value of one, and identifying as a second one or more bits those bits of the sequence of bits having a binary value of zero. Selecting the plurality of blocks may then include selecting one or more blocks from the first sequence of blocks at respective positions corresponding to those of the first one or more bits, and selecting one or more blocks from the second sequence of blocks at respective positions corresponding to those of the second one or more bits.

In some examples, the key may be produced further based on a version value that is updated with each write operation at the memory location having the respective address. In these examples, each memory location of the window of memory locations may store the respective block of ciphertext produced with the respective key that also depends on the version value and thereby changes with each write operation.

In some further examples, producing the plurality of sub-keys may include producing the plurality of sub-keys further from the version value. And in some even further examples, the respective address and version value may be represented as respective sub-sequences of bits that concatenated form a sequence of bits at respective bit positions, and again, the key material may be represented as a sequence of blocks at respective block positions. In these examples, producing the plurality of sub-keys may include identifying a plurality of bits from the sequence of bits, and selecting a plurality of blocks from the sequence of blocks at respective positions corresponding to those of the plurality of bits, with the plurality of blocks being selected as the plurality of sub-keys.

In some examples, the mixing the plurality of sub-keys may include mixing the plurality of sub-keys together and with at least a portion of the version value.

In some examples, performing the scrambling operation may include performing the scrambling operation on the version value added to the intermediate result.

In some examples, performing the scrambling operation may include performing the scrambling operation with an increased-sized, reduced-round cipher, a permutation defined by one or more rotate-add-exclusive-or operations, or one or more layers of substitution boxes.

In other aspects of example implementations, a system is included for providing security in a computer system. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, for example, reference may be made herein to quantitative measures, values, relationships or the like (e.g., planar, coplanar, perpendicular). Unless otherwise stated, any one or more if not all of these may be absolute or approximate to account for acceptable variations that may occur, such as those due to engineering tolerances or the like. Furthermore, it should be understood that unless otherwise specified, the terms "data," "content," "information," and similar terms may be at times used interchangeably. Like reference numerals refer to like elements throughout.

Figure 1:
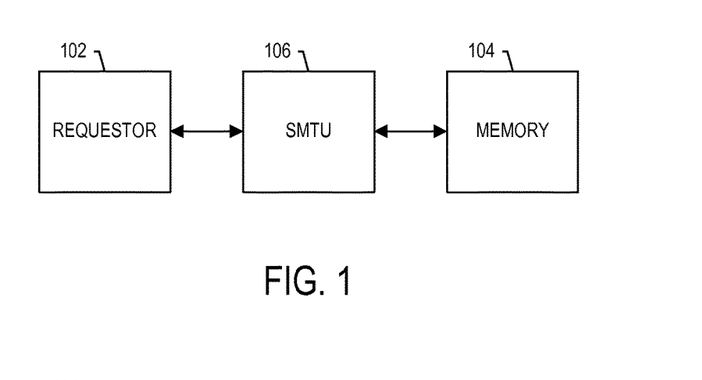
FIG. 1 is an illustration of a system in accordance with example implementations of the present disclosure.

Referring now to FIG. 1, a system 100 is illustrated according to example implementations of the present disclosure. The system may include one or more of each of a number of components, units or the like (generally "components") at least some of which may be composed of logic circuits such as multiplexers, registers, arithmetic logic units, memory, microprocessors and the like. The system may be designed for any of a number of different applications, and may have particular applicability in systems including or coupled to memory susceptible to attacks, such as in-flight computers, military and space programs, corporate network, personal and laptop computers, smart mobile devices. As shown, for example, the system may include one or more components referred to herein as requestors 102 configured to initiate or otherwise request read and/or write transactions (at times referred to as operations) with one or more memories 104, which in some examples may occur on one or more buses between them.

In accordance with example implementations, the system 100 may further include one or more components referred to herein as secure memory transaction units (SMTUs) 106 configured to encrypt and decrypt data transfers between a requestor 102 and memory 104, and may be used in at least some if not all read or write transactions with the memory. And as described below, in some but perhaps not all examples, the SMTUs may also be configured to authenticate the contents of the memory. In various examples, the SMTU design may be memory agnostic in that the type and location of the memory (internal or external) may be "unknown" to the SMTU.

The SMTU 106 may provide, with very high probability, a different encryption key for every location in the memory 104. In some examples, the SMTU may generate these encryption keys using an algorithm referred to herein at times as a double-mix Feistel network (DMFN). The SMTU may use standard encryption algorithms as ciphers, such as a combination of standard operation modes of the Advanced Encryption Standard (AES) cipher, for encryption and authentication of the contents of the memory. Or in some examples, the SMTU may use the DMFN for encryption and authentication. Each amount (e.g., 16 bytes) of plaintext data (sometimes simply referred to as plaintext or data) to be stored at a respective memory location at least within a window of memory locations may be encrypted with a unique encryption key and tagged with a version value and data authentication tag, which may be stored at the memory location with the encrypted data (at times referred to as ciphertext).

In some examples, the version value may be derived from a global write counter (GWC) (e.g., 48-bit value) that indicates the number of encrypted write operations that have taken place such as in a current computing session. In other examples, the version value may be derived using the number of write operations over multiple computing sessions, a time stamp or the like. Or in yet other examples, the version value may be derived from a clock.

In some examples, the GWC may be reset at the beginning of every session of secure operation. The GWC values may be stored in-the-clear or encrypted with the user data, and modified by a secret mask value before use as part of the key generation. The GWC value may be incremented before any write operation by an increment value, which may be sized similar to the GWC (e.g. 48-bit value). This increment value may be a large odd value that does not have many consecutive 1's or 0's in its binary representation. Examples of suitable increment values are segments of the bit sequences of $\pi$, e, $\sqrt{2}$, $\sqrt{3}$, the golden ratio, etc. Use of values such as these may assure that consecutive GWC values differ in about half the bits, in the average. Use of an odd GWC increment value may assure that the GWC will not wrap around in typical applications for more than ten years of continuous operation.

The data authentication tag at a memory location may depend on the ciphertext at that memory location, and in a manner that is cryptographically secure in that an adversary cannot create a valid data authentication tag, nor may the adversary be able to deduce any information about the ciphertext from the data authentication tag. In some examples, the data authentication tag may serve as a message authentication code, a short piece of information used to authenticate the ciphertext, and to detect data tampering and forgery. The tag may protect both the ciphertext's integrity as well as its authenticity, by allowing detection of any changes to it. In some examples, the tag may be implemented by a block cipher, that is, an algorithm that operates on the ciphertext to perform a transformation specified by a key.

The ciphertext and data authentication tag at a memory location may be produced with keys based on at least the version value and address of the memory location. The version value may be updated with each write operation at a memory location, and the key with which the ciphertext is produced may thereby change with each write operation, as well as from memory location to memory location. The data authentication tag may be produced with a second key different from the key that produced the block of ciphertext; but like that key, the second key may change with each write operation and from memory location to memory location. In some examples, a secret random number and other values, such as a security mode value, may be incorporated to further diversify the encryption and authentication. As described herein, the term random may be used broadly to refer to either random or pseudorandom.

During read transactions in which the requestor 102 has requested data from the memory, the SMTU may read previously-encrypted data (ciphertext) from the memory. The encrypted data may be decrypted and authenticated by the SMTU against signs of tampering; and the SMTU may return the decrypted data (plaintext) to the requestor in instances in which the data is considered valid. In write transactions, the SMTU may read the data at a target location, then decrypt and authenticate that data just as with a read access. Once this is complete, the SMTU may cause the data to be written to be merged with the data read from the location, encrypted, and then written back to the memory. As used here, merged means to replace the portion of the data read back that has changed. If desired, a different approach can be used when a complete block of ciphertext is to be written. In these instances, the merge operation may become a replacement, and the initial read operation may be omitted, trading security for speed.

In various examples, a method for providing security for read data being transferred between, or within, units in the system 100 may include dividing the memory 104 into a series of addressable locations (the memory thereby being an addressable memory), each having an address and each storing encrypted data, a version value (sometimes referred to as version information) and a data authentication tag. As described herein, an addressable location of the memory may at times be varyingly but equally referred to as an address, a location or an addressable location. A unique encryption key for the encrypted data, and a different, unique authentication key for the data authentication tag, may be used for each address. These keys may be unpredictable to an adversary, and kept secret before, during and after they are used.

In each read operation, the version value, data authentication tag and a block of ciphertext may be read at a memory location having a respective address. The respective keys with which the ciphertext and data authentication tag were produced may be regenerated using the version value and respective address. The ciphertext may be decrypted with its key to produce its corresponding plaintext. And using the second key for the data authentication tag, the ciphertext may be compared with the data authentication tag to verify its integrity and authenticity.

In each write operation, new plaintext data may be written to a memory location in memory 104. In some examples, each write operation may be preceded by a data read at the location and verification of the data by the SMTU 106 as valid. The process of writing data to the memory location may include the SMTU updating the version value such as to reflect a new number of memory write operations made. The SMTU may then generate another key for encryption of the new data using the updated version value and respective address of the memory location (and perhaps a random number and/or some other values), and the SMTU may generate a new second key for production of a new data authentication tag that depends on the encrypted new data.

In a further aspect of example implementations of the present disclosure, the SMTU 106 may be configured to implement a particular algorithm for the encryption of data for a window of memory locations in the memory 104, where each of the memory locations stores a respective block of ciphertext produced with a respective key that changes from memory location to memory location. This may include the SMTU being configured to produce a plurality of sub-keys from a respective address of a memory location in the memory 104. The SMTU may mix the plurality of sub-keys together to produce an intermediate result, with the plurality of sub-keys being mixed using a binary tree of bitwise exclusive-or (XOR) operations—this tree at times referred to simply as an XOR tree. The SMTU may perform a scrambling operation on the intermediate result to produce a key, and produce a block of ciphertext with the key. In some examples, the scrambling operation may be a cipher of intermediate result with another key to produce the key. The SMTU may then perform a write operation to write the block of ciphertext at the memory location having the respective address. The key (ciphertext) may be invisible, so security requirements are less stringent than for general encryption.

In some examples, the respective address may be represented as a sequence of bits at respective positions, and the key material may be represented as a sequence of blocks at respective positions. In these examples, the SMTU 106 may be configured to identify a plurality of bits from the sequence of bits, and select a plurality of blocks from the sequence of blocks at respective positions corresponding to those of the plurality of bits, with the plurality of blocks being selected as the plurality of sub-keys.

The SMTU 106 may identify bits from the address in any of number of different manners. For example, the SMTU may identify only those bits of the sequence of bits having a preset binary value (e.g., binary value of one). In another example, SMTU may identify as first bit(s) those bits of the sequence of bits having a binary value of one, and identify as second bit(s) those bits of the sequence of bits having a binary value of zero. In this other example, the sequence of blocks may be divided into first and second sequences, and the SMTU may select block(s) from the first sequence of blocks at respective positions corresponding to those of the first bit(s), and select block(s) from the second sequence of blocks at respective positions corresponding to those of the second bit(s).

In some examples, the key may be produced further based on a version value that is updated with each write operation at the memory location having the respective address. In these examples, each memory location of the window of memory locations stores the respective block of ciphertext produced with the respective key that also depends on the version value and thereby changes with each write operation.

The SMTU 106 may be configured to produce the plurality of sub-keys further from the version value. In this regard, the respective address and version value may be represented as respective sub-sequences of bits that concatenated form a sequence of bits at respective bit positions, and the key material may be represented as a sequence of blocks at respective block positions. The SMTU, then, may identify a plurality of bits from the sequence of bits, and select a plurality of blocks from the sequence of blocks at respective positions corresponding to those of the plurality of bits, with the plurality of blocks being selected as the plurality of sub-keys.

In another example, the SMTU 106 may be configured to mix the plurality of sub-keys together and with at least a portion of the version value. And in yet another example, the SMTU may be configured to perform the scrambling operation on the version value added to the intermediate result.

Figure 2:
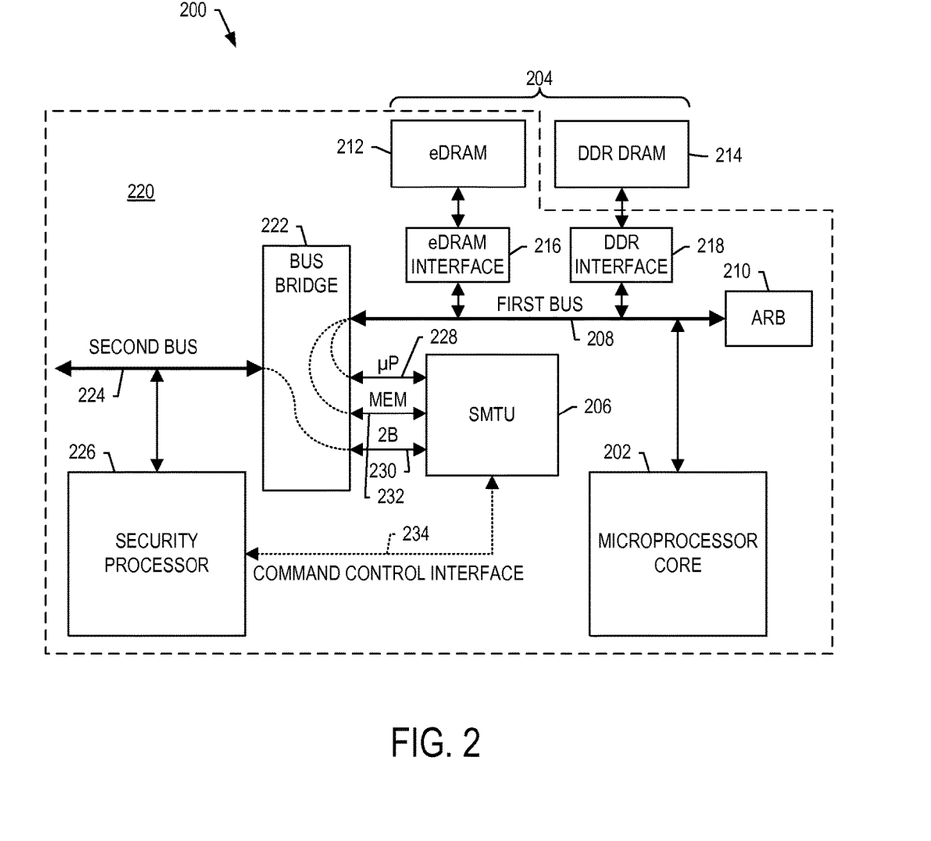
FIG. 2 is an illustration of a system that in some examples may correspond to the system of FIG. 1.

FIG. 2 illustrates one example of a system 200 that in some examples may correspond to the system 100 of FIG. 1. The system may be constructed in accordance with any of a number of different approaches. In some examples, the system may be constructed according to a system-on-chip (SoC) approach in which the components of a system are integrated into a single integrated circuit (IC) (sometimes referred to as a "chip"). In a more particular example, the system may be constructed according to the CoreConnect microprocessor bus-architecture from IBM Corporation. As described herein, various components of the system or functions of components of the system may be described in the nomenclature of a particular technology such as SoC or even CoreConnect. It should be understood that any specific nomenclature used herein is merely for purposes of illustration, and should not be taken to limit the scope of example implementations of the present disclosure.

Similar to the system 100 of FIG. 1, the system 200 of FIG. 2 may include a number of components at least some of which may be composed of logic circuits. As shown, for example, the system may include a microprocessor core 202, memory 204 and SMTU 206, which in some examples may function as or correspond to the requestor 102, memory 104 and SMTU 106 of FIG. 1. Although not shown, it should be understood that the system may include other components that may at times be configured to function as a requestor, which again may be a component configured to initiate or otherwise request read and/or write transactions with memory.

As shown in FIG. 2, the microprocessor core 202 may be directly or indirectly coupled to a first bus 208 along with the memory 204, SMTU 206 and other components, and use of the first bus may be allocated by an arbitration circuit 210. In one example, the microprocessor core may be a PowerPC core commercially available from IBM Corporation, and the first bus may be a processor local bus (PLB). Examples of suitable memory include embedded dynamic access memory (eDRAM) 212, double data rate synchronous (or other) dynamic random access memory (DDR DRAM) 214 or the like, some of which may be coupled to the first bus by respective memory controls or interfaces 216, 218. In some examples in which the system is constructed as a SoC with various components integrated into a single integrated circuit 220, the memory may be off-chip (external) from other components of the system, and may be coupled to the first bus by an on-chip (internal) memory control. This is illustrated, for example, by the DDR DRAM in FIG. 2.

The components coupled to the first bus 208 may also include a bus bridge 222 between the first bus and another, second bus 224 such as a transaction bus to which additional components may be coupled, such as a security processor 226 and perhaps components that may at times function as requestors. In some examples, the first bus may be a high-speed bus with high-performance components coupled thereto, and the second bus may be a low-speed bus. In these examples, the bus bridge may serve to separate the high-performance components from the low-performance components, which may in turn improve system performance.

The SMTU 206 may be configured to encrypt and decrypt data transfers between requestors such as the microprocessor core 202 and either or both of the eDRAM 212 or DDR DRAM 214. The SMTU may act as a slave unit serving read and write requests initiated by the microprocessor core or another requestor, where the SMTU may initiate the read or write as requested from a particular memory address. The SMTU may thereby provide a high level of security for these transactions.

The SMTU 206 may be coupled in the system 200 in any of a number of different manners. As shown, for example, the SMTU may be coupled to the bus bridge 220 by three bidirectional external data interfaces, and may be coupled to the security processor 226 by another bidirectional external data interface. That is, the SMTU may be coupled to the bus bridge by a microprocessor-core interface 228, a second-bus interface 230 and a memory interface 232, and coupled to the security processor by a command-and-control interface 234.

The microprocessor-core interface 228 may be coupled to the microprocessor core 202 via the first bus 208 to receive control information such as requests to read data from and/or write data to memory 204. The second-bus interface 230 may be coupled to the second bus 224, and the memory interface 232 may be coupled to the memory via the first bus. The bus bridge 220 may allow transactions over the microprocessor-core interface and memory interface be routed only to and from the first bus, and the transactions over the second-bus interface to be routed only to and from the second bus. The command-and-control interface 234, then, may enable the security processor 226 to provide command and control information to the SMTU through a separate interface.

Figure 3:
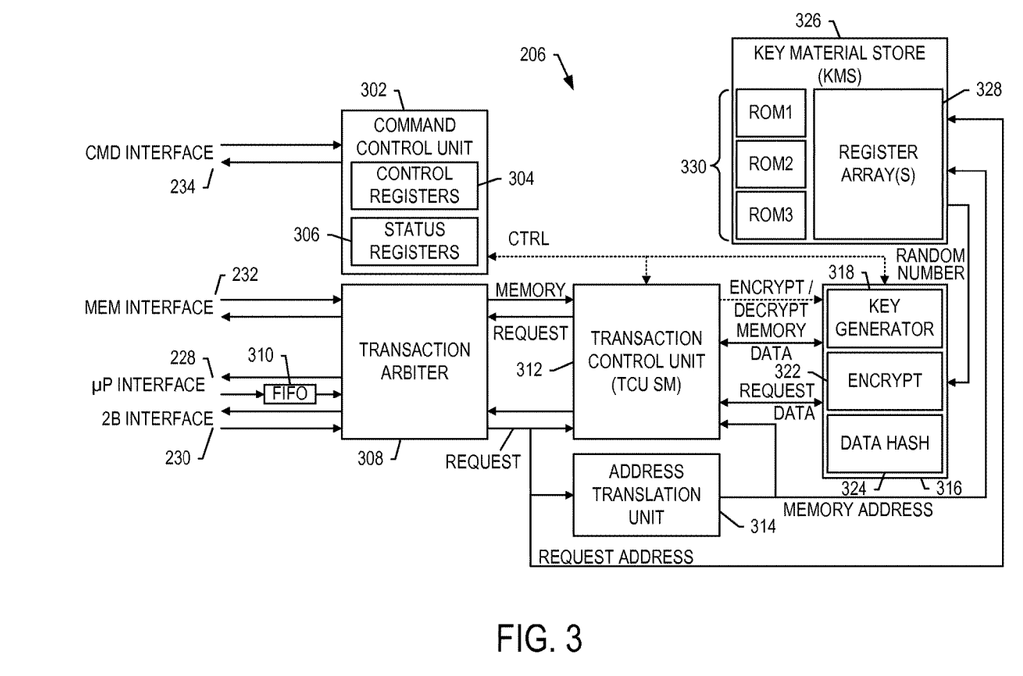
FIG. 3 is an illustration of a secure memory transaction unit, in accordance with example implementations.

FIG. 3 is a diagram illustrating various components of the SMTU 206 of FIG. 2, at least some of which, again, may be composed of logic circuits. As shown, the SMTU may include, and the command-and-control interface 234 may be coupled to, a command control unit 302 having control registers 304 and status registers 306. The SMTU may include a transaction arbiter 308 coupled to and configured to allocate use of the microprocessor-core interface 228, second-bus interface 230 and memory interface 232. A first-in first-out (FIFO) memory 310 on the microprocessor-core interface may be configured to buffer transactions to the arbiter.

The arbiter 308 may also be coupled to a transaction control unit 312 and an address translation unit 314, and the transaction control unit may be in turn coupled to a cryptography unit 316 that provides a key generator 318, encryption unit 320 and data-hashing unit 322. The cryptography unit may be coupled to a key material store (KMS) 326 configured to provide random numbers to the key generator to generate keys for the encryption unit and data-hashing unit. The encryption unit may be configured to encrypt and decrypt data for all read and write operations with an appropriate memory 204 in response to read or write requests invoking the SMTU 206. And the data-hashing unit may be configured to produce data authentication tags for encrypted data (ciphertext) read from and written to the memory. In some examples, the encryption unit may be configured to employ an AES cipher for encryption and decryption operations, and the data-hashing unit may be configured to employ a keyed hash function.

In some examples, the KMS 326 may include one or more register arrays 328 (sometimes referred to as KMS memories) configured to provide random numbers. Because the SMTU relies on random numbers provided by the KMS, the use of high quality random numbers is often desirable. In some examples, then, the KMS may include four 64×64 register arrays that provide 16K-bit random numbers. Prior to operation, the KMS unit may be initialized with 16K-bit random numbers, which in some examples may be generated outside of the SMTU.

As an alternative to using a true random number, in some examples, the KMS 326 may be initialized from one or more onboard configuration/entropy read-only memory blocks (ROMs) 330 such as 512×16 ROMs, three of which are shown as ROM1, ROM2 and ROM3. These ROMs may contain random numbers generated during system design. Using the configuration ROMs as the source of the random numbers may make the generated keys less random, therefore degrading the strength of the anti-tampering mechanism. However, there are applications in which using the ROMs as the random number sources may be desirable. One application is of a time critical application, in which long initialization delays that are associated with generation of the random number are not acceptable. Another type is an application that needs to generate an encrypted data image that can be restored following a system reset or an image that can be restored on a different system.

Further information regarding various features of the system 200 and SMTU 206 according to example implementations may be found below and in the aforementioned, related and incorporated '871 application.

Figure 4:
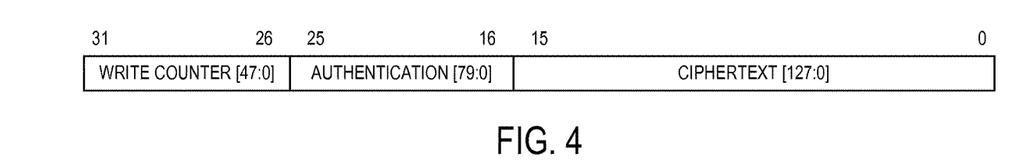
FIG. 4 illustrates the data structure of information stored in a memory location, in accordance with example implementations.

FIG. 4 illustrates the data structure for encrypted data stored in memory 104, 204, according to some example implementations of the present disclosure. As shown, encrypted data may be stored using 32-byte blocks each of which may include 16 bytes of encrypted payload (ciphertext), and 16 bytes of security data. The security data may include 6 bytes of version value (in the illustrated example, a write counter value), and 10 bytes of authentication tag. The 6-byte write counter is a field that may be incremented every time a memory location is written, regardless of the address. As a result, the incremented value is unique to each address. The encryption operation and the authentication key for a memory location may be derived from its address, and write counter value, and from a random number. In other examples, more or fewer fields may be used in the encryption. Because every 16 bytes of encrypted data require an additional 16 bytes for an authentication tag and write counter value, the effective data storage capacity of each window of memory locations may be one-half its physical size. But again, in other examples, larger or smaller memories and different data and tag sizes may be implemented.

As explained above, the SMTU 106, 206 may be configured to generate encryption keys (e.g., key generator 318) using an algorithm that makes use of an XOR tree mixing sub-keys. This key generation may be based on secret random numbers (e.g., KMS 326), and may also be diversified by memory location address and perhaps other data, such as version value, configuration data or the like. In this regard, the sub-keys may be blocks of secret random numbers in a sequence of blocks at positions corresponding to those of certain bits in a memory location address, such as those bits having a binary value of one (or alternatively zero). The sub-keys may then be mixed together using an XOR tree. In a 32-bit address space for blocks of ciphertext (128 GB physical RAM with 16 byte blocks of ciphertext being accessed together), a depth 5 XOR tree may be sufficient for mixing the sub-keys, which together may cause some 12 . . . 15 gate delays, far less than a single clock cycle.

The output of this XOR tree for some sets of selected values may give an output of 0, which without more may result in encryption keys that may be correlated by simple operations. The algorithm of example implementations may therefore produce an intermediate result at the output of the XOR tree, which may then be scrambled to produce the encryption key without this regularity. In some examples, this scramble operation may be a cipher that depends on another key, which similar to the sub-keys may be a secret random number. This operation may also avoid a key of 0 being given for memory location at address 0.

In some examples, the scrambling operation may be a non-linear permutation (one-to-one mapping). Examples of suitable scrambling operations include reduced-round lightweight ciphers such as SIMON, PRINT or PRESENT with extended buffers, but there are many similarly small and fast ciphers. SIMON is a Feistel network construction, while PRINT and PRESENT are substitution-permutation ciphers, with increasingly complex substitution boxes (s-boxes). S-Boxes are small nonlinear substitution permutations. In the s-boxes of the PRINT cipher, three input bits may be mapped to three output bits, and in s-boxes of the PRESENT cipher, four input bits may be mapped to four output bits.

Examples of suitable scrambling operations include reduced-round Feistel networks (e.g., 2 . . . 4 rounds), double-mix Feistel networks (DMFNs) (e.g., 1 . . . 2 rounds), permutations defined by rotate-add-XOR (RAX) operations, one or more layers s-boxes (e.g., PRESENT cipher s-boxes) and the like. More information regarding the DMFN in particular may be found in U.S. patent application Ser. No. 14/472,978, entitled: Double Mix Feistel Network for Key Generation or Encryption, filed Aug. 29, 2014, the content of which is hereby incorporated by reference in its entirety.

The more complex the cipher, the better it may scramble the intermediate result (but it also takes longer to execute). The cipher may be performed in a number of rounds, such as in a number sufficient to fit in a single clock cycle, and the aforementioned reduced-round ciphers may provide comparable mixing properties.

It should be noted that simply performing a cipher operation on the memory location address may produce unrelated keys, but in some cases this may be prohibitively slow since even lightweight extended buffer versions of ciphers such as PRESENT and PRINT need several clock cycles. Since the key material in this case may also be small, the system may also be exposed to certain types of physical attacks. It should also be noted, though, that in some examples scrambling the memory location address may be adequate, and produce a resulting key equivalent to the case of non-random 32-bit sub-keys, each with a single bit having a binary value of one).

More notationally, the key generation algorithm of example implementations may include producing a plurality of sub-keys ($K_{A1}, K_{A2}, \ldots, K_{An-1}, K_{An}$), which may be blocks in a sequence at positions corresponding to certain bits (A1, A2, ..., An-1, An) in a memory location address. In some examples, these sub-keys may be shorter (e.g., 64 ... 128 bits) than a desired encryption key (e.g., 256 bits). The sub-keys may be mixed together using an XOR tree to produce an intermediate result, such as in accordance with the following ($\oplus$ denoting an XOR operation):

$$K_{INT} = K_{A1} \oplus K_{A2} \oplus \ldots K_{An-1} \oplus K_{An}$$

Figure 5:
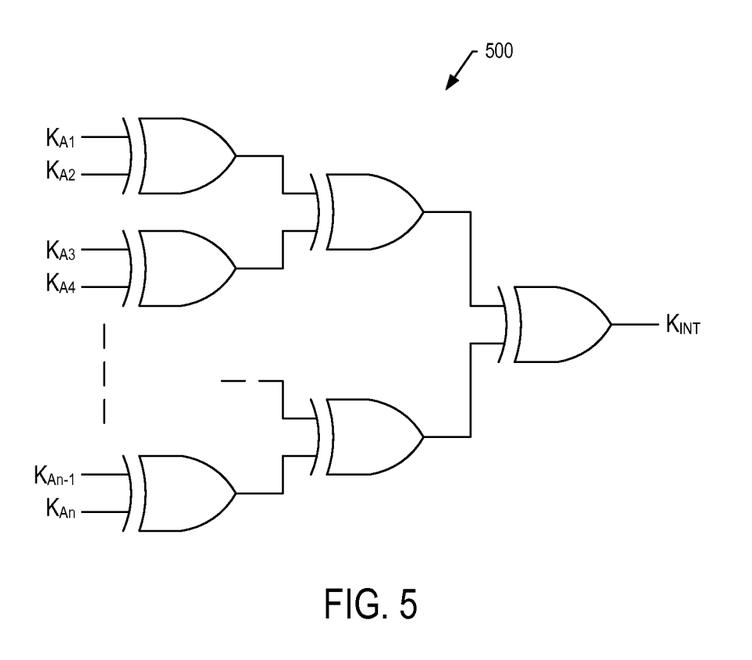
FIG. 5 illustrates a binary tree of exclusive-or (XOR) operations, in accordance with various example implementations.

FIG. 5 illustrates an XOR tree 500 including a plurality of XOR logic gates that may be implemented to carry out the mixing operation. In FIG. 5, each of the logic gates represents a series of gates, one for each bit of the values on which they operate. The intermediate result may then be scrambled, and if appropriate expanded to a desired length, to produce an encryption key. This may be performed in accordance with a scrambling function (SCR) that depends on another key (Kb):

$$Key = SCR_{Kb}(K_{INT})$$

In some examples, this other key (Kb) may be of different length than the length of the resulting key or the input (e.g., 128 ... 256 bits).

As indicated above, the key generation in some examples may be diversified not only by memory location address, but also other data such as the version value that may be updated with each write operation at the memory location. In some examples, the version value or bits of it may be mixed with the sub-keys in the XOR tree (now larger). In some examples, the version value may be added (e.g., XOR-ed, concatenated) to the intermediate result, and that result may be scrambled.

In some examples, the memory location address and version value may be concatenated and the resulting sequence of bits used to select blocks of key material for the sub-keys, which in the event the version value is as long as the memory location address, may double the number of blocks that may be selected. In this regard, in a 32-bit address space in which each block is 256 bits, the key material may be as large as 32×256=8192 bits. Concatenating the address with a 32-bit version value produces a sequence of 64 bits, which may lead to the key material being as large as 64×256=16,384 bits, which may further improve physical security.

In some examples, the sequence of blocks may be divided into first and second sequences, which may produce two sets of sub-keys $\{K_{Ai}\}$ and $\{K_{Bi}\}$. When bit i of the memory location address has a binary value of zero, the block $K_{Ai}$ may be selected for the XOR tree, and when bit i of the address has a binary value of one, the block $K_{Bi}$ may be selected. This may double the number of key material bits influencing the generated keys, without increasing the processing time, and may therefore provide added anti-tamper benefits. Moreover, the exact same number of XOR operations may be performed for each memory location address, which may reduce the potential information leakage on side-channels (most notably on variations of power consumptions and delay timing).

Returning to FIGS. 2 and 3, at write operation at a memory location in the window of memory locations in the memory 204 according to example implementations may include the microprocessor core 202 generating a request for data at a memory location having a respective address, and providing that address to the memory 204 on the first bus 208. Of course, rather than receiving the address from the microprocessor core, the address may be provided from some other requestor such as a direct memory access controller.

The received address may also be provided to the SMTU 206. In some examples, the address may be a logical address, and may be translated by the address translation unit 314 to a physical address. The address may be provided through the transaction control unit 312 to the key generator 318, which may functionally include three key generators, at times referred to herein as key generators W, C and D configured to generate respective keys W, C and D, one or more of which in some examples may be generated according to the above-described algorithm that uses an XOR tree. Each of the three key generators may also receive the random numbers earlier stored or generated in the KMS 326. Stored at the memory location is the write counter value (e.g., version value), data authentication tag and block of ciphertext, and this information may be provided to the transaction control unit. In some examples, the write counter value may be encrypted, and this encryption can be very simple, and its key can be a predefined constant, without significant loss of security.

The encryption unit 320 or another component of the SMTU 206 may decrypt the write counter value using key W. The encryption unit 320 may decrypt the ciphertext using key C, while the transaction control unit may employ the data-hashing unit 322 to verify the integrity of the ciphertext based on the ciphertext, key D and data authentication tag, and in some examples. Assuming that the integrity of the ciphertext is verified, the decrypted ciphertext (now plaintext) may be rewritten to the memory location. On the other hand, instances in which the ciphertext authenticity is not verified may signal an error.

In instances in which an error occurs, it may indicate that a random error or possible data tampering has occurred, and the transaction control unit 312 may perform any of a number of different actions in response. For example, the transaction control unit may cause the system 200 to (i) stop processing all read and write requests, (ii) delete the random number used for encryption in the current session, (iii) flush all registers that participated in key generation activities, (iv) trigger a memory flush to overwrite the content of the memory window with all zeros, or (v) take other action. In another example, the transaction control unit may maintain a fault counter, which may be incremented in response to an error. In this approach, if a threshold of the number of errors is reached, the transaction control unit may cause any one or more of the aforementioned actions. This approach may be useful in a noisy environment where random memory read errors occasionally occur.

In some examples, a write operation at a memory location in the memory 204 may be preceded by a read operation at the memory location, such as that described above, to verify that the data stored at the memory address is authentic. If prior read is performed, only if the read operation establishes the authenticity of the data, does a write operation occur. In some examples, then, the write operation may include the transaction control unit 312 being configured to merge new data to be written with the decrypted ciphertext (plaintext).

The transaction control unit 312 being configured to increment a GWC, and provide the updated value to each of key generators C and D of key generator 318. Using the incremented write counter value and the address of the memory location, key generators C and D may generate new keys C and D (e.g., using the XOR tree-based algorithm), and provide the keys to the encryption unit 320 and data-hashing unit 322, respectively. The encryption unit may use new key C to encrypt the merged plaintext to produce new ciphertext, and the data-hashing unit may use the reproduced ciphertext and key D to produce a new data authentication tag. The combination of key W and the incremented GWC value may be used to provide an encrypted write counter value. The resulting write counter value, data authentication tag and ciphertext may then be returned and written to the memory location.

Figure 6:
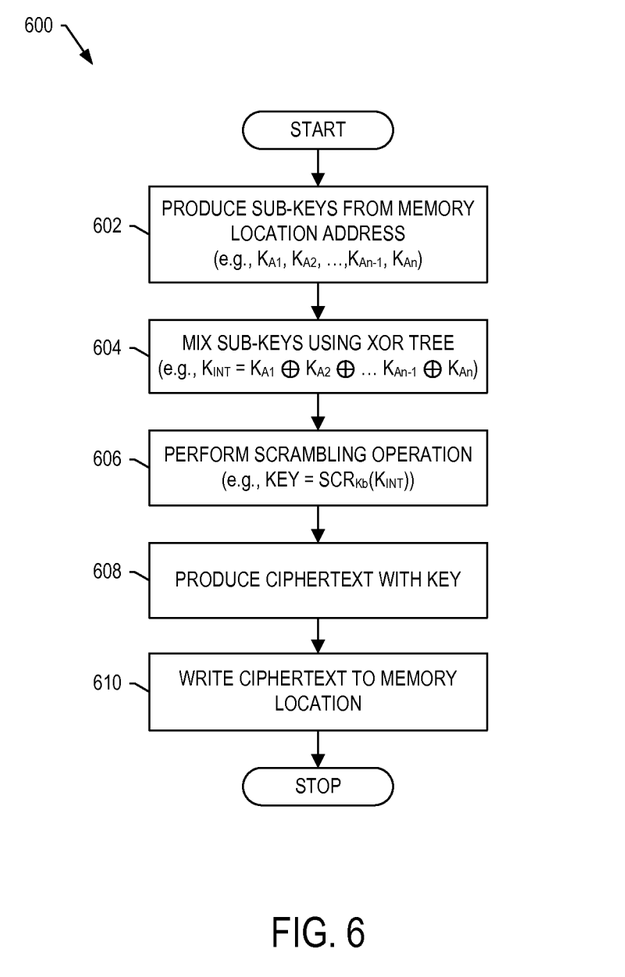
FIG. 6 illustrates a flowchart including various operations in a method according to example implementations.

FIG. 6 illustrates various operations in a method 600 of providing security in a computer system, according to example implementations of the present disclosure. As shown at block 602, the method may include producing a plurality of sub-keys from a respective address of a memory location in a memory. The method may include mixing the sub-keys together using a binary tree of exclusive-or operations, and to produce an intermediate result, as shown at block 604. The method may include performing a scrambling operation on the intermediate result to produce a key with which a block of ciphertext may be produced, as shown at blocks 606 and 608. And the method may include performing a write operation to write the block of ciphertext at the memory location having the respective address, as shown at block 610. In this regard, the memory may include a window of memory locations each of which stores a respective block of ciphertext produced with a respective key that changes from memory location to memory location.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for providing security in a computer system, the system comprising one or more logic circuits configured to at least:
   receive a respective address of a memory location in a memory;
   produce a plurality of sub-keys from random key material and based on random key material and based on the respective address, the plurality of sub-keys being a plurality of blocks of random numbers;
   mix the plurality of sub-keys together to produce an intermediate result, the plurality of sub-keys being mixed using a binary tree of multiple levels of bitwise exclusive-or operations;
   perform a scrambling operation on the intermediate result to produce a key;
   produce a block of ciphertext with the key; and
   perform a write operation to write the block of ciphertext at the memory location having the respective address,
   wherein the memory includes a window of memory locations each of which stores a respective block of ciphertext produced with a respective key that changes from memory location to memory location, the key is produced further based on a version value that is updated with each write operation at the memory location having the respective address, and each memory location of the window of memory locations stores the respective block of ciphertext produced with the respective key that also depends on the version value and thereby changes with each write operation,
   wherein the respective address and version value are composed of respective sub-sequences of bits that concatenated form a sequence of bits at respective bit positions, and the random key material is composed of a sequence of blocks of random numbers at respective block positions, and
   wherein the one or more logic circuits being configured to produce the plurality of sub-keys includes being configured to produce the plurality of sub-keys further from the version value, including the one or more logic circuits being configured to identify a plurality of bits from the sequence of bits, and select the plurality of blocks from the sequence of blocks at respective positions corresponding to those of the plurality of bits, the plurality of blocks being selected as the plurality of sub-keys.

2. The system of claim 1, wherein the respective address is composed of a sequence of bits at respective positions, and the random key material is composed of a sequence of blocks of random numbers at respective positions, and
   wherein the one or more logic circuits being configured to produce the plurality of sub-keys includes being configured to identify a plurality of bits from the sequence of bits, and select the plurality of blocks from the sequence of blocks at respective positions corresponding to those of the plurality of bits, the plurality of blocks being selected as the plurality of sub-keys.

3. The system of claim 2, wherein the one or more logic circuits being configured to identify the plurality of bits includes being configured to identify only those bits of the sequence of bits having a preset binary value.

4. The system of claim 2, wherein the sequence of blocks includes a first sequence of blocks of random numbers and a second sequence of blocks of random numbers,
   wherein the one or more logic circuits being configured to identify the plurality of bits includes being configured to identify as a first one or more bits those bits of the sequence of bits having a binary value of one, and identify as a second one or more bits those bits of the sequence of bits having a binary value of zero, and wherein the one or more logic circuits being configured to select the plurality of blocks includes being configured to select one or more blocks from the first sequence of blocks at respective positions corresponding to those of the first one or more bits, and select one or more blocks from the second sequence of blocks at respective positions corresponding to those of the second one or more bits.

5. The system of claim 1, wherein the one or more logic circuits being configured to mix the plurality of sub-keys includes being configured to mix the plurality of sub-keys together and with at least a portion of the version value.

6. The system of claim 1, wherein the one or more logic circuits being configured to perform the scrambling operation includes being configured to perform the scrambling operation on the version value added to the intermediate result.

7. The system of claim 1, wherein the one or more logic circuits being configured to perform the scrambling operation includes being configured to cipher the intermediate result with another key to produce the key.

8. The system of claim 1, wherein the one or more logic circuits being configured to perform the scrambling operation includes being configured to perform the scrambling operation with an increased-sized, reduced-round cipher, a permutation defined by one or more rotate-add-exclusive-or operations, or one or more layers of substitution boxes.

9. A method of providing security in a computer system, the method comprising:

receiving a respective address of a memory location in a memory;

producing a plurality of sub-keys from random key material and based on random key material and based on the respective address, the plurality of sub-keys being a plurality of blocks of random numbers;

mixing the plurality of sub-keys together to produce an intermediate result, the plurality of sub-keys being mixed using a binary tree of multiple levels of bitwise exclusive-or operations;

performing a scrambling operation on the intermediate result to produce a key;

producing a block of ciphertext with the key; and performing a write operation to write the block of ciphertext at the memory location having the respective address, wherein the memory includes a window of memory locations each of which stores a respective block of ciphertext produced with a respective key that changes from memory location to memory location, the key is produced further based on a version value that is updated with each write operation at the memory location having the respective address, and each memory location of the window of memory locations stores the respective block of ciphertext produced with the respective key that also depends on the version value and thereby changes with each write operation, wherein the respective address and version value are composed of respective sub-sequences of bits that concatenated form a sequence of bits at respective bit positions, and the random key material is composed of a sequence of blocks of random numbers at respective block positions, and wherein producing the plurality of sub-keys includes producing the plurality of sub-keys further from the version value, including identifying a plurality of bits from the sequence of bits, and selecting the plurality of blocks from the sequence of blocks at respective positions corresponding to those of the plurality of bits, the plurality of blocks being selected as the plurality of sub-keys.

10. The method of claim 9, wherein the respective address is composed of a sequence of bits at respective positions, and the random key material is composed of a sequence of blocks of random numbers at respective positions, and wherein producing the plurality of sub-keys includes identifying a plurality of bits from the sequence of bits, and selecting the plurality of blocks from the sequence of blocks at respective positions corresponding to those of the plurality of bits, the plurality of blocks being selected as the plurality of sub-keys.

11. The method of claim 10, wherein identifying the plurality of bits includes identifying only those bits of the sequence of bits having a preset binary value.

12. The method of claim 10, wherein the sequence of blocks includes a first sequence of blocks of random numbers and a second sequence of blocks of random numbers, wherein identifying the plurality of bits includes identifying as a first one or more bits those bits of the sequence of bits having a binary value of one, and identifying as a second one or more bits those bits of the sequence of bits having a binary value of zero, and wherein selecting the plurality of blocks includes selecting one or more blocks from the first sequence of blocks at respective positions corresponding to those of the first one or more bits, and selecting one or more blocks from the second sequence of blocks at respective positions corresponding to those of the second one or more bits.

13. The method of claim 9, wherein mixing the plurality of sub-keys includes mixing the plurality of sub-keys together and with at least a portion of the version value.

14. The method of claim 9, wherein performing the scrambling operation includes performing the scrambling operation on the version value added to the intermediate result.

15. The method of claim 9, wherein performing the scrambling operation includes ciphering the intermediate result with another key to produce the key.

16. The method of claim 9, wherein performing the scrambling operation includes performing the scrambling operation with an increased-sized, reduced-round cipher, a permutation defined by one or more rotate-add-exclusive-or operations, or one or more layers of substitution boxes.

* * * * *